Figure 6:
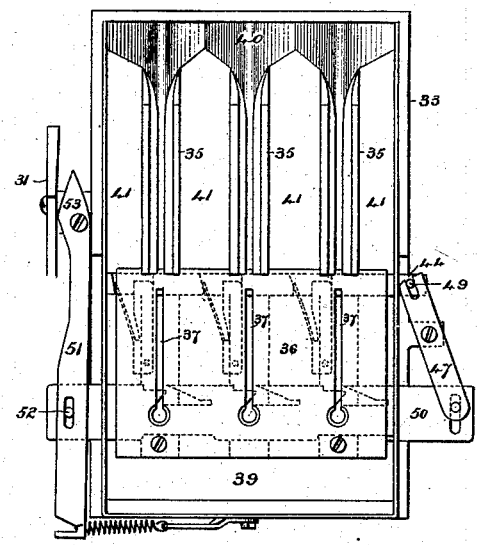

(No Model.)  4 Sheets—Sheet 1.
J. H. FOSTER.
Nailing Machine.
No. 237,380. Patented Feb. 8, 1881.
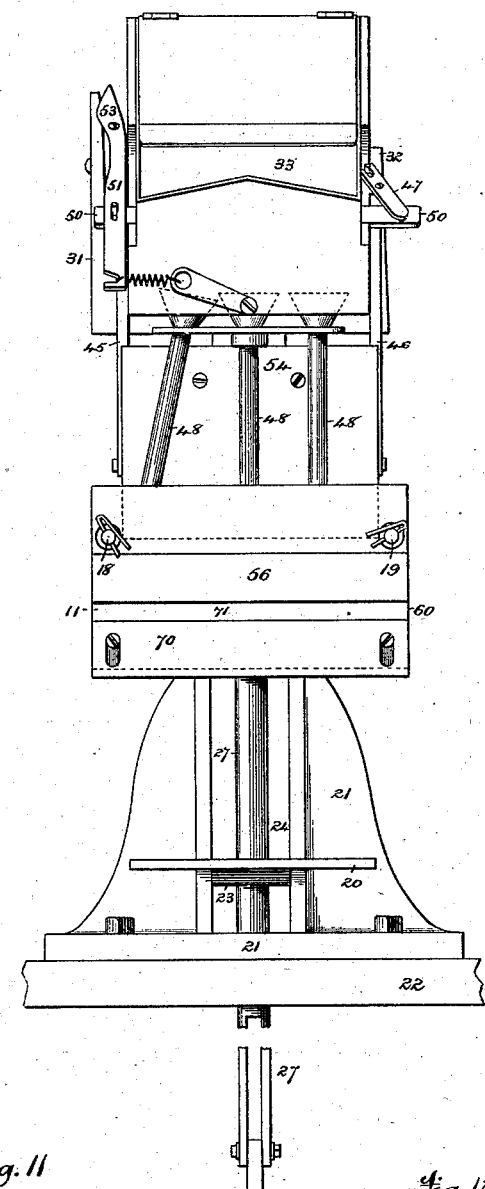
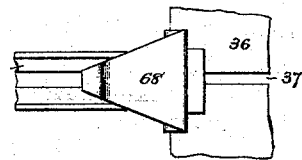
Attest:
G. H. Graham
J. H. Palmer
Inventor;
John H. Foster,
by Munson & Philipp
Attys.

(No Model.) 4 Sheets—Sheet 2.
J. H. FOSTER.
Nailing Machine.
No. 237,380. Patented Feb. 8, 1881.
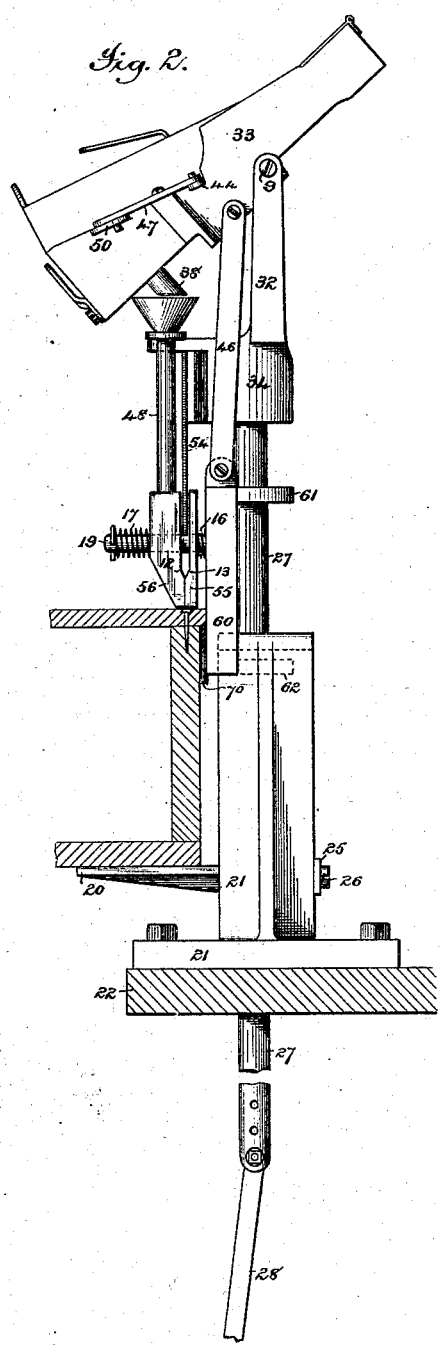
Fig. 2.
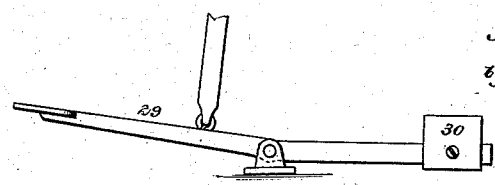
Attest:
Geo. H. Graham
P. H. Palmer
Inventor,
John H. Foster,
by Munson & Philipp
Att'ys.
N. PETERS, PHOTO-LITHOGRAPHER, WASHINGTON, D C.

(No Model.) 4 Sheets—Sheet 3.
J. H. FOSTER.
Nailing Machine.
No. 237,380. Patented Feb. 8, 1881.
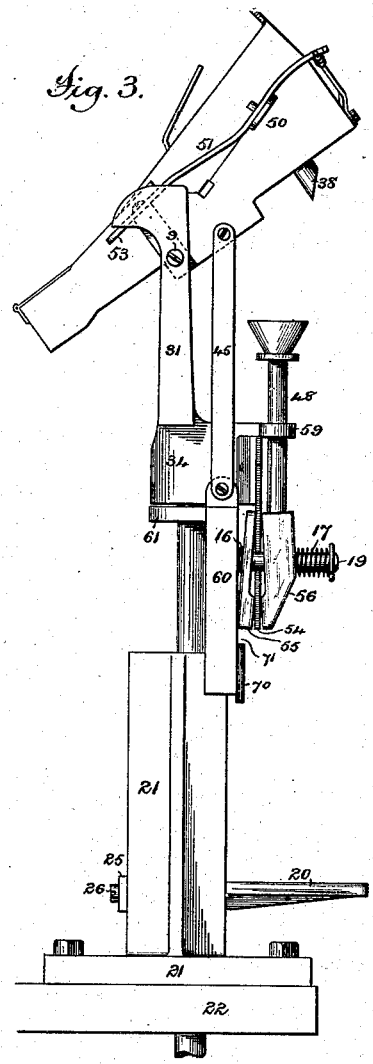
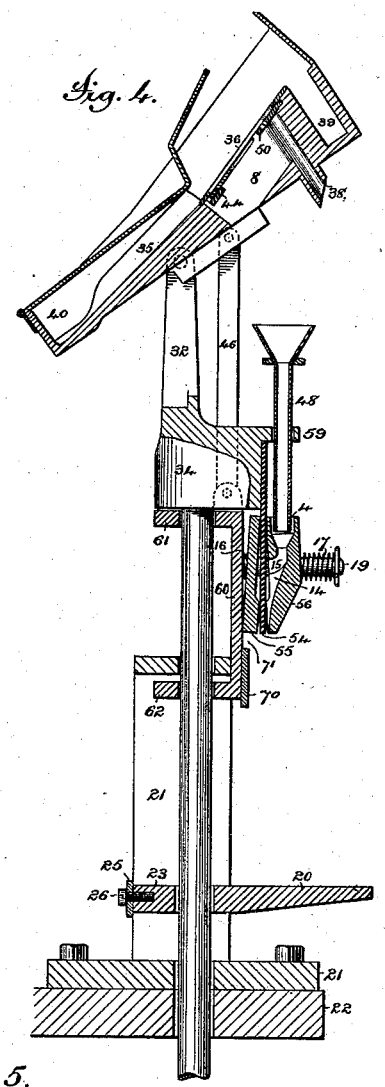
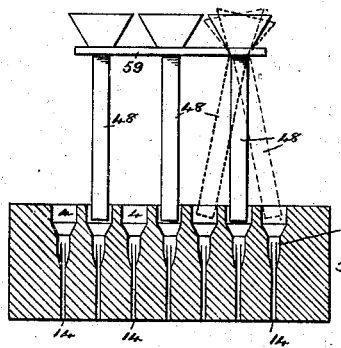
Attest:
Geo. H. Graham
T. H. Palmer
Inventor,
John H. Foster,
by Munson & Philipp
Attys.

(No Model.) 4 Sheets—Sheet 4.

J. H. FOSTER.
Nailing Machine.

No. 237,380. Patented Feb. 8, 1881.

Attest:
G. W. Graham
N. H. Palmer

Inventor,
John H. Foster,
by Munson & Philipp
Att'ys.

N. PETERS, PHOTO-LITHOGRAPHER, WASHINGTON, D. C.

UNITED STATES PATENT OFFICE.

JOHN H. FOSTER, OF CHICAGO, ILLINOIS.

NAILING-MACHINE.

SPECIFICATION forming part of Letters Patent No. 237,380, dated February 8, 1881.

Application filed October 12, 1880. (No model.)

*To all whom it may concern:*

Be it known that I, JOHN H. FOSTER, a citizen of the United States, residing in the city of Chicago, county of Cook, and State of Illinois, have invented certain new and useful Improvements in Nailing-Machines, fully described and represented in the following specification and the accompanying drawings, forming a part of the same.

Figure 7:
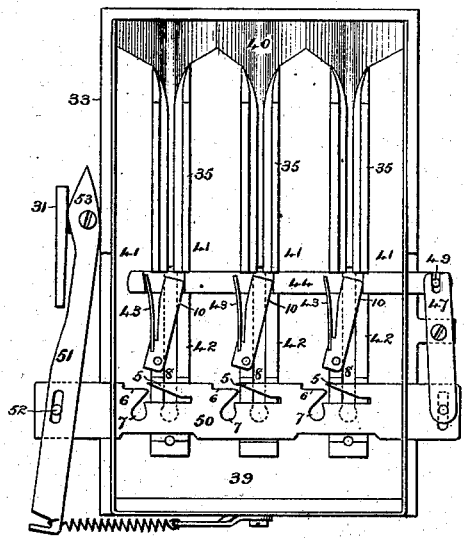
Figure 8:
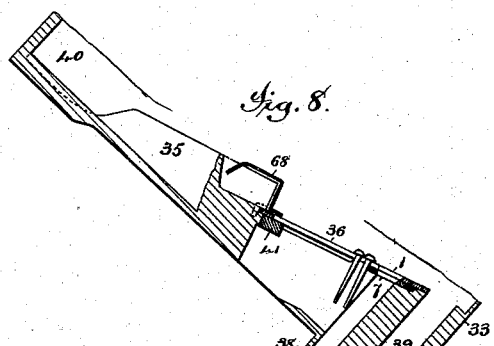
Figure 9:
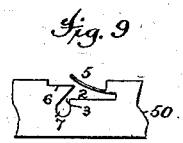
Figure 10:
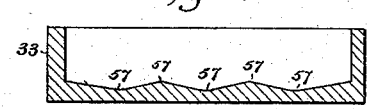

A machine embodying the improvements constituting my invention is illustrated in the drawings, as follows:

Figure 1 represents a front elevation, Fig. 2 a right-hand-side elevation, Fig. 3 a left-hand-side elevation, Fig. 4 a vertical sectional elevation, Fig. 5 a longitudinal sectional elevation, of the nail-conducting tubes and nail-guiding plate; Fig. 6, a plan view of the nail-hopper with its cover removed; Fig. 7, a plan view of the nail-hopper with its cover and guide-plate removed; Fig. 8, an enlarged sectional view of the hopper-setting die and conducting-tube; Fig. 9, a plan view of a modification of the nail-feeding plate; Fig. 10, a sectional elevation of the rear end of the hopper; Fig. 11, a plan view of the means for cutting off the feeding-supply of nails; Fig. 12, a sectional plan view of the nail-feeding channels; and Fig. 13, an elevation, partly in section, of a modified form of nail-setting mechanism, of which Fig. 14 is a sectional elevation.

The invention relates to that class of machines which operate to drive one or many nails into work sustained beneath a nail-holding guiding-die and a reciprocating plunger or driver; and said invention consists, chiefly, in an improved nail-feeding mechanism, an improved nail-guiding die, an improved work-support, and various constructions and combinations of parts too particularly hereinafter set forth to need preliminary description.

In order to a ready understanding of the improvements effected, I will now describe the structure and operation of the various mechanisms composing the apparatus.

The work-supporting bed is shown in the form of a table, 20, that is secured to the main frame or pedestal 21, which latter may be attached to a bed-plate, as 22, or form part of a base that rises to a working height from the floor. This table 20 is a flat plate, having a guide arm or arms, 23, extending through a recess or recesses, 24, in the pedestal 21, so as to be capable of a vertical adjustment therein, its various positions being secured by a cross plate or plates, 25, which are clamped upon the rear face of the pedestal by means of screws 26. The guide arm or arms 23 are arranged to admit of the free passage through or past them of the vertical shaft 27, upon which the nail-feeding, work-clamping, and nail-driving mechanisms are carried and operated. The shaft 27 extends below the pedestal 21, and is provided with means which sustain it in a raised position and accomplish its vertical reciprocations, said means, as shown, being a connecting-rod, 28, hung to a foot-treadle, 29, that is provided with a weight, 30, whereby the said shaft is normally held upward, and may be depressed by a downward movement of said treadle.

The nail-feeding mechanism is contained in a hopper, 33, of rectangular form, that is mounted so as to be vibrated upon pivots 9, by which it is attached to the side arms, 31 32, of a carrying-hub, 34, that is fast to the shaft 27, its vibratory movements being effected by means of rods 45 46, which connect it with a frame, 60, that slides upon said shaft by means of slotted guide-arms 61 62, the latter of which fits the recess 24 in the pedestal 21. This hopper is provided internally with chutes 35—as many in number as may be required—which extend from a common receptacle, 40, at its rear end, that communicates with all the chutes forward to a point about central, where they connect with the narrow slots 37 of a guide-plate, 36, which narrow slots 37 terminate at their forward ends in apertures 1, of a size to admit the passage of the nail-head, which apertures are situated over the openings in delivery-tubes 38, that extend from beneath said plate through the bottom of the hopper 33 and protrude therefrom. This plate 36 rests upon supports 42, that are provided with longitudinal recesses 8, which continue the slots 37 vertically and terminate in said delivery-tubes 38. Beneath this guide-plate the hopper is provided at its front end with a reservoir, 39, which is connected with the receptacle 40 at the rear end of the hopper by channels 41, beneath the guide-plate, which are provided on each side of the chutes 35 and on each side of the supports 42, which are continuations of the bodies of the chutes 35.

The nails to be driven may occupy promiscuous positions in the reservoir 39 and receptacle 40, and may slide from one to the other when the hopper is tipped backward. The hopper is somewhat deeper at its forward end than at its rear end, and at the latter portion it is provided with corrugations, as 57, (see Fig. 10,) the raised parts of which intersect the channels 41, while the low parts terminate in the rear of the chutes 35 and unite with their channels, thus forming a guiding-way that acts to straighten the nails as they move rearward, and thus arrange them in position to surely enter the chutes, the channels in which start from the surface of the bottom of the hopper and gradually rise to the plane of the guide-plate 36, and consequently the recesses 41 will readily guide the nails from the reservoir 39 to the receptacle 40, when the hopper is tipped backward, as in Fig. 4, and the chutes will receive and guide nails from the receptacle 40 onto the plate 36, when the hopper is tipped forward, as in Fig. 8. Such nails as are guided onto said plate, as last described, whether presented thereto head or point foremost, will, when their bodies are projected far enough to overlie a slot, 37, be supported by the flanges of their heads only, and consequently their shanks, which are of less diameter than their heads, will gravitate through said slots and depend within the recess 8. Each nail being thus suspended by the flanges of its head resting upon the edges of plate 36 that form the channels 37 will, in such position, slide downward until it is arrested or enters and descends in the tube 38. As it is requisite that only one nail at a time shall so descend, each slot 37 and recess 8 is provided with a feed-governing device to so limit their feeding movement. This is provided by a laterally-reciprocating feeding-plate, 50, which is seated beneath the plate 36 in recesses cut for its reception in the supports 42. This plate 50 has a delivery-aperture, 7, of a size suited to admit the passage of a nail-head, and is also provided with recesses that proceed from said aperture 7 and terminate at the rear edge of the plate, their shape being such as to form a zigzag channel, 2 3, that provides a tongue, 5, and a stop, 6. (See Fig. 9.) The lateral reciprocations of the plate 50 are produced by means of a spring-seated lever, 51, a slot in which embraces a pin, 52, projecting from the plate, which lever is vibrated by contact of its cam end 53 with the side of the arm 31. Normally, or when the hopper is tipped forward, this plate 50 is held in the position shown in Fig. 6, with its stops 6 presented across the slots 37 and recesses 8, and hence the shanks of all nails fed to and caused to depend in the said slots and recesses rest against said stops, and such nails are thus prevented from moving far enough forward to have their heads freed from the slots 37 or to enter their shanks into the tubes 38; but the shank of each foremost nail so supported rests far enough forward to have the tongue 5 enter behind it when the plate 50 moves laterally, and therefore as the hopper is tipped backward to engage the cam 53 of the lever 51 with the arm 31, this lateral movement will be produced in time to cause the tongue to pass behind such nail and separate it from those in its rear, which nail will thereafter be retained in the channel 2 during the lateral movement of the plate in one direction, and then in the channel 3, and pass thence and be so guided as to finally be embraced by the aperture 7 as the return movement of the plate is effected—that is, during the forward tipping movement of the hopper. When thus embraced by the aperture 7 its head will also be within the aperture 1, and being free from the support of the slot 37 said nail will quickly gravitate through the tube 38 and be delivered therefrom. As the rearward tipping of the hopper inclines the guiding-slots 37 of its plate 36, so that the nails free to move therein all slide rearward, it is obvious that unless prevented they would escape from said slots and return to the receptacle 40 of the hopper, by which action the slots would be cleared and the regular feed of single nails could not be accomplished. In order to prevent such defective action, I have provided a cut-off at the rear ends of the slots 37, which consists of jaws 10 pivoted to the supports 42, so as to vibrate beneath the plate 50, said jaws being pressed constantly in one direction by springs 43, and moved in the other by means of a bar, 44, that slides in ways cut in the supports 42 and sides of the hopper, which bar has shoulders bearing against one end of the jaws 10. This bar is reciprocated by means of a lever, 47, the bifurcated end of which embraces a pin, 49, on the bar, while its opposite end is pivoted to the plate 50. When the hopper tips backward, as in Fig. 4, and the tongue 5 moves to retain the foremost nail, the bar 44 moves simultaneously to allow the springs 43 to press the jaws 10 across the recesses 8, and thus to seize and arrest all the remaining nails depending in said recesses and sliding in the slots 37 by means of the suspending action of their flanged heads. Thus such nails are not only prevented from sliding out of the slots 37, but, by reason of the clamping action of the spring-jaws 10, are prevented from jumping out of the same during any jarring action of the apparatus. When the hopper again tips forward, as in Fig. 8, and completes the release of the nails then controlled by the zigzag channel in the plate 50, the jaws will so move as to clear the recess for the admission of more nails guided thereto by the chutes 35; but the nails already in the recesses and slots will descend toward the forward end of the plate and then be arrested by the foremost one encountering the stop 6. Should the slot 37 become charged with nails to its fullest capacity, any additional nails directed to it will simply pass over the plate 50 and drop from its forward edge into the reservoir 39. At each forward vibration of the hopper, therefore, a nail will be delivered from each one of the tubes 38. At this time said tubes are carried over the mouths of conveying-tubes 48, which will carry such nails to the devices that direct them into a position to be driven.

The mechanisms for setting or driving the nails consist of a nail-guiding die and a nail driver or setter. This nail-driver is shown as a broad plate, 54. It might be a series of narrow drivers attached to the hub 34, while the nail-guiding die is secured to a reciprocating carrier 60, which is governed in its movements by its guide-arms 61 62, which slide upon the shaft 27, and its rear face, which slides in contact with the face of the pedestal 21. This nail-guiding die consists of a back plate, 55, and a front plate, 56, which is provided with recesses 4, (see Fig. 5,) in which the conducting-tubes 48 rest. These plates are supported so as to move upon rods 18 19, that project from the carrier 60, and are pressed toward each other by means of springs 16 17, the elastic power of which causes them to close together to receive a nail, as in Figs. 2 and 8, or to be forced open, as in Figs. 3 and 4, when a nail is to be set or driven by the descent of the driver 54.

This setting-die is of peculiar construction. The lower portions of its plates 55 56 are constructed so as to be closed together in face contact, while their upper portions provide a cavity with inclines 12 13, in which the driving-plate 54 may stand in its normal or raised position, as in Fig. 8. The plate 56 is provided with peculiar feeding channels or ways, extending the recesses 4 downward to guide a nail beneath the driver 54. Thus they have a central guide channel or way 14, through which the shank of the nail is free to move, and with a laterally-extended guide-slot, 15, in which the flanged head of the nail is forced to travel. Both of these slots progressively incline toward the inner face of the plate 56, as they descend, but the inclination of the slot 15 is more gradual than that of the slot 14, so that the shank of the nail may descend in the slot 15 a distance nearly equal to its length and move toward the plate 55 gradually, while the head of the nail in descending moves more quickly toward said plate, the result being that the vertical descent of the entire nail with respect to its setting position may be nearly accomplished before its final lateral movement to the true setting position beneath the driver 54 is made, whereby, when the descending movement is nearly accomplished, the nail-head which has the greatest diameter will be vertically aligned with the shank, and the whole nail may receive a lateral movement bodily into the setting position or beneath the driver. When so moved by the peculiar form of the slots described it stands suspended between the plates 55 56, with its head resting against their inner faces, its head being beneath the driver 54, and its point properly directed to be forced from between said plates, thus standing in a position to be driven by the descending movement of the driver. (See Fig. 8.) As this driver descends it engages the head of the nail and carries it downward, the head of the nail there being forced against the inclines 12 13, and thus spreading the plates 55 56 to admit the passage of the nail down into the material to be nailed. The table 20 is adjusted so as to cause the box or other material to be nailed that is rested upon it to present its upper portion in proper position beneath the plates 55 56, while the mechanisms stand as is shown in Figs. 2 and 8, whereupon, by pressure exerted upon the treadle 29, the shaft 27 and the various parts it carries descend until the plates 55 56 rest upon the top of said box and thus clamp it, by their superincumbent weight, between their faces and the table, there holding it stationary. The plates 55 56 and their frame 60 are thereby arrested, and a further movement of the shaft 27 will cause the hub 34 to descend, bringing with it the hopper 33 and the driver 54, the former remaining in its forwardly-inclined position until the latter moves through the die to engage the nails it holds, spread its plates, and drive said nails into the box, during which setting or driving action the arms 31 32 fast to the hub 34 will draw down the rear end of the hopper, and tip up its forward end to cause the nails to move rearward in said hopper. When the nails are driven and the treadle is released the reverse motions will ensue—that is, the driver 54 will move upward to allow the plates 55 56 to close, the hopper will tip forward to complete the feed of nails to the tubes 48 and recharge the setting die, and the carrier 60 will move upward to raise the setting-die and thereby release the nailed work.

In order to determine the number of nails composing the row to be driven as well as to determine their relative position, I have devised a means of preventing their entrance into the slots 37, and also constructed the tubes 48 so that they may be adjusted to guide the properly-fed nails into any desired nail-receiving recess in the plate 56. The first effect is produced by means of stop-gates, constructed so as to be adjusted in place to shut off communication from the receptacle 40 to the chutes 35, or from the latter to the slots 37 in the plate 36. As a means of carrying out this feature of the invention, I have shown a stop-plate, 68, that consists of a plate of metal bent so as to embrace a chute, 35, and rest upon the plate 36, and thus held present a wall closing the channel in the chute, thereby arresting any nails that may enter said channel and preventing their passage onto the plate. The second effect is accomplished by mounting the tubes 48 in suspending-hangers, as 59, so that they may be adjusted with their delivery ends entered into any desired one of the receiving recesses 4 in the plate 56. (See Fig. 5.)

To adapt the apparatus to drive nails in inclined, oblique, or other angles in the material to be nailed, I modify the guide-die by providing it with nail-guiding channels inclined to suit the direction to be given to the nail, and the driver is constructed so that it may move laterally with the nail-head after it is brought into contact with it, and thus not distort it in the driving process. To insure this lateral movement the nail-driver is provided with properly-inclined guide-slots 57 and horizontal guide-slots 58, in which pins projecting from said driver play.

If it is desired to drive nails in oppositely-inclined directions, as is desirable in making wooden boxes, the driver will be divided into sections, as A B, and each section be adapted to move in the appropriate direction. This feature of the improvements is of great importance, since, by driving nails in an inclined direction, lighter bodies may be used and a great saving in cost effected.

Figure 13:
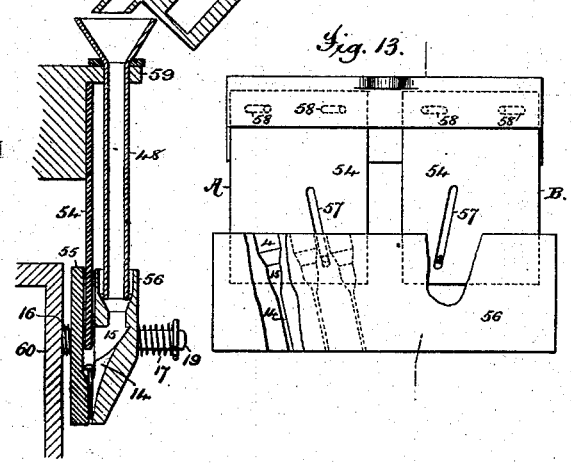
Figure 14:
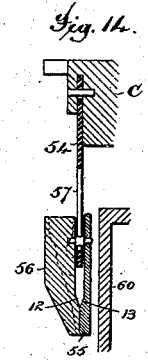

The driver may, instead of the plate form, consist of a suitable number of separate drivers, each suited to the size of the nail to be driven, which drivers will project from a head or plate, C, as a common holder for them all, which, in the modification shown in Fig. 13, would be provided with the means for imparting a lateral movement to it and consequently to each individual driver.

The work-supporting table may be stationary or movable, and made convex, concave, or of other shape to suit it for supporting any work the lapped parts of which it is desired to secure together, and when the nails are to be clinched such will be used as are long enough to protrude through the work and have their ends turned by contact with the metal table.

In box-work a common difficulty arises from the fact that the cover or bottom or such parts as are lapped over others, not being made accurately, protrude beyond the part to which they are to be nailed. In that case, unless provision is made to accommodate that defective structure, the protruding edge will become the guide, and the nails be driven parallel thereto without regard to the location of the receiving part into which the nails must enter. I avoid this result by providing a bearing-plate, 70, that is secured to the pedestal 21, so as to be adjustable vertically thereon by slots and set-screws, as shown, or in any other common manner, so as to provide above its upper face a recess, 11, of proper size, into which the protruding part of the work may enter, and thus enable its side, which is the part that determines the true position for the nails, to be pressed against said plate 70. When this recess requires to be deeper than the plate is thick, it may be extended by placing packing-strips behind said plate.

In some work where it is desired to use cut nails, the shanks of which are of varying relative dimensions, and which are wider in one direction than the other, it is necessary to modify the nail-feeding plate 50, so that its tongue 5 shall have a spring-like action, as is shown in Fig. 9, but which may be provided by various constructions. When such spring-tongue, the outer end of which is curved, is used, it will, by its elasticity, surely enter behind the nail, engage the same, and insure the successive feeding of single nails to the nail-guiding die.

The nail cut-off device by which the rearward movement of the partially-fed nails suspended in the guide slots of the feeding-plate 31 is prevented from resulting in their being detached from said slots, may be modified considerably so long as the operation of the same is such as to act elastically in one direction to prevent the escape of the nails rearward out of the slots, and positively in the opposite direction to permit the nails to move forward in said slots. It may thus be made in the form of a plunger-spring seated so as to be pressed forward against the rearmost end of a row of nails suspended in a slot, 37, and acting to hold the said row forward as the hopper tips backward, and provided with actuating-levers operated by a cam or similar means to draw said plunger rearward when the hopper is tipped forward.

What I claim is—

1. A nailing apparatus consisting, essentially, of a work-supporting table, a reciprocating nail-setting die, a nail-driver reciprocating through said die, and a nail-feeding mechanism the hopper or carrier of which is vibrated by the reciprocation of the nail-driver to cause the feeding operation, all substantially as described.

2. A nail-feeding mechanism consisting of a slotted guide-plate, as 36, having an aperture, as 1, and a laterally reciprocating feeding-plate, as 50, having a tongue, as 5, channels, as 2 3, and aperture 7, substantially as described.

3. The combination of the slotted guide-plate, as 36, having an aperture, 1, a laterally-reciprocating feeding-plate, as 50, having tongue 5, channels 2 3, and aperture 7, with a chute, as 35, and a hopper, substantially as described.

4. The combination with the hopper, as 33, of guide-plate 36 and chute 35, whereby nail-channels 41, connecting the reservoir 39 and receptacle 40, are provided, substantially as described.

5. The combination, with the nail-channels 41 and chutes 35, of the corrugations, as 67, of the hopper 33, whereby nails are straightened so as to lie in a position to readily pass from the channels to the chutes, substantially as described.

6. The combination, with a vibrating hopper, as 33, and the slotted plate 36, of an automatically-operating controlling device that presses upon the nails in the slot 37 when the hopper tips rearward, to prevent displacement of said nails contained in the said slot, substantially as described.

7. The combination, with a hopper, as 33, and its slotted guide-plate, as 36, of a spring-seated jaw, as 10, that automatically operates to press upon and hold nails in the slot of said plate when the hopper tips rearward, substantially as described.

8. The combination of a hopper, as 33, its slotted guide-plate, as 36, recessed support 42, and spring-seated jaw 10, substantially as described.

9. The combination of a hopper, as 33, its slotted guide-plate, as 36, recessed support 42, spring-seated jaw 10, and feeding-plate 50, substantially as described.

10. The combination, with the chute 35, of the stop-gate, substantially as described, for the purpose of preventing the feed of nails to the setting position.

11. A nail-setting die consisting of spring-seated plates, as 55 56, having their inner faces cut away to provide a channel in which the driver 54 may descend without spreading the plates, and inwardly-projecting inclines 12 13, with which said driver engages to force said plates apart, substantially as described.

12. A conveying device, whereby a nail is presented beneath the driver, consisting of a narrow inclined channel, as 14, for the nail-shank, and a laterally-extended channel, as 15, for the nail-head, whereby the shank is carried forward faster than the head, and the nail is brought into a vertical position as it enters beneath the driver, substantially as described.

13. The combination, with the feeding-recesses, of a nail-guiding die, of nail-conveying tubes, as 48, arranged so as to be moved from one to another of such recesses, and thus convey nails to different setting points, substantially as described.

14. The combination, with a work-support and a single nail-driver, of a nail-guiding die having a series of inclined nail-guiding channels, whereby a series of nails are simultaneously driven in angular positions, substantially as described.

15. The combination, with a work-support and a nail-guiding channel, of a nail-driver having means for moving it laterally during the driving operations, substantially as described.

16. The combination, with a work-support, a nail-guiding die and a nail-driver, of an adjustable plate, as 70, substantially as described.

In testimony whereof I have hereunto set my hand in the presence of two subscribing witnesses.

JOHN H. FOSTER.

Witnesses:
H. T. MUNSON,
T. H. PALMER.